UNITED STATES PATENT OFFICE.

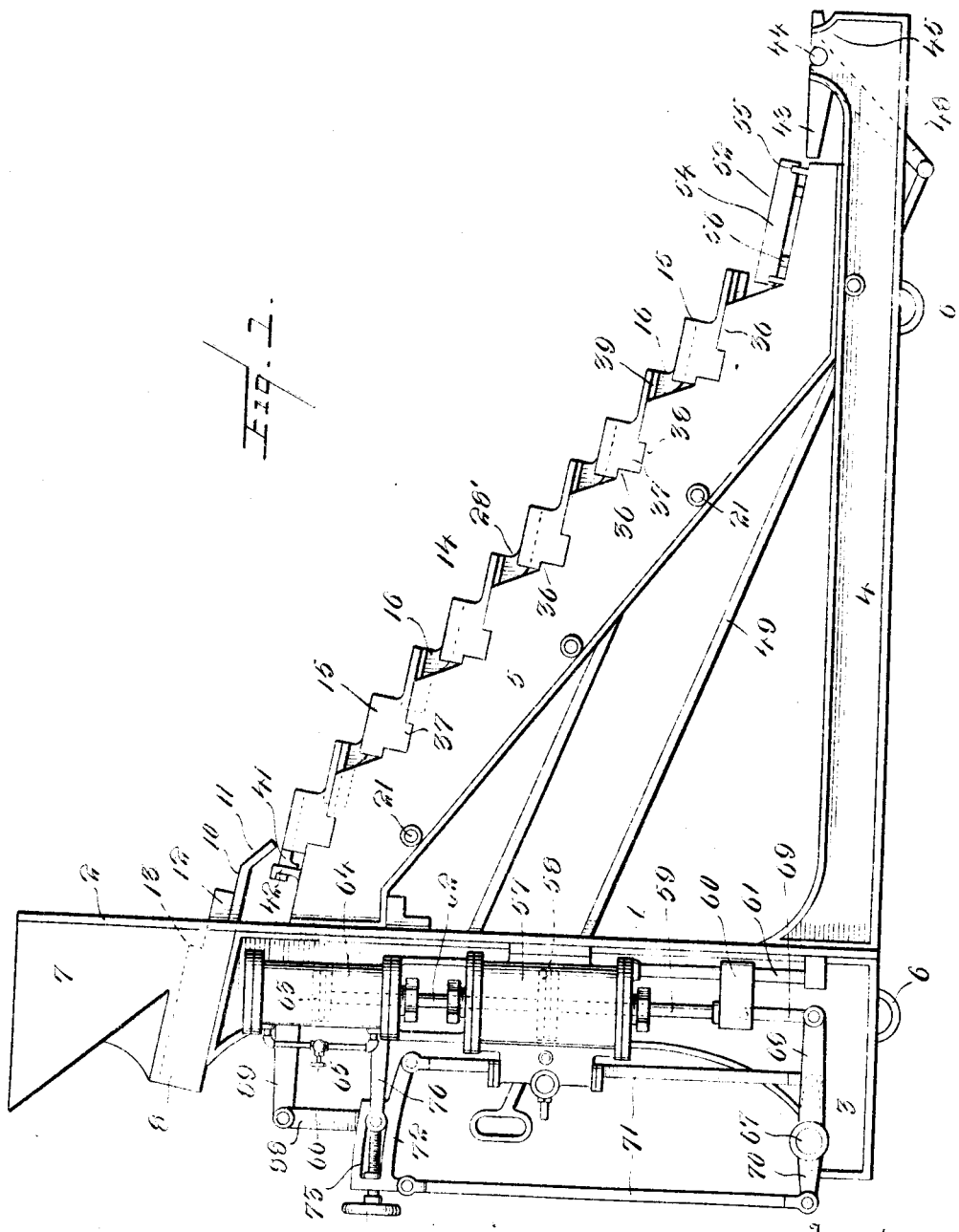

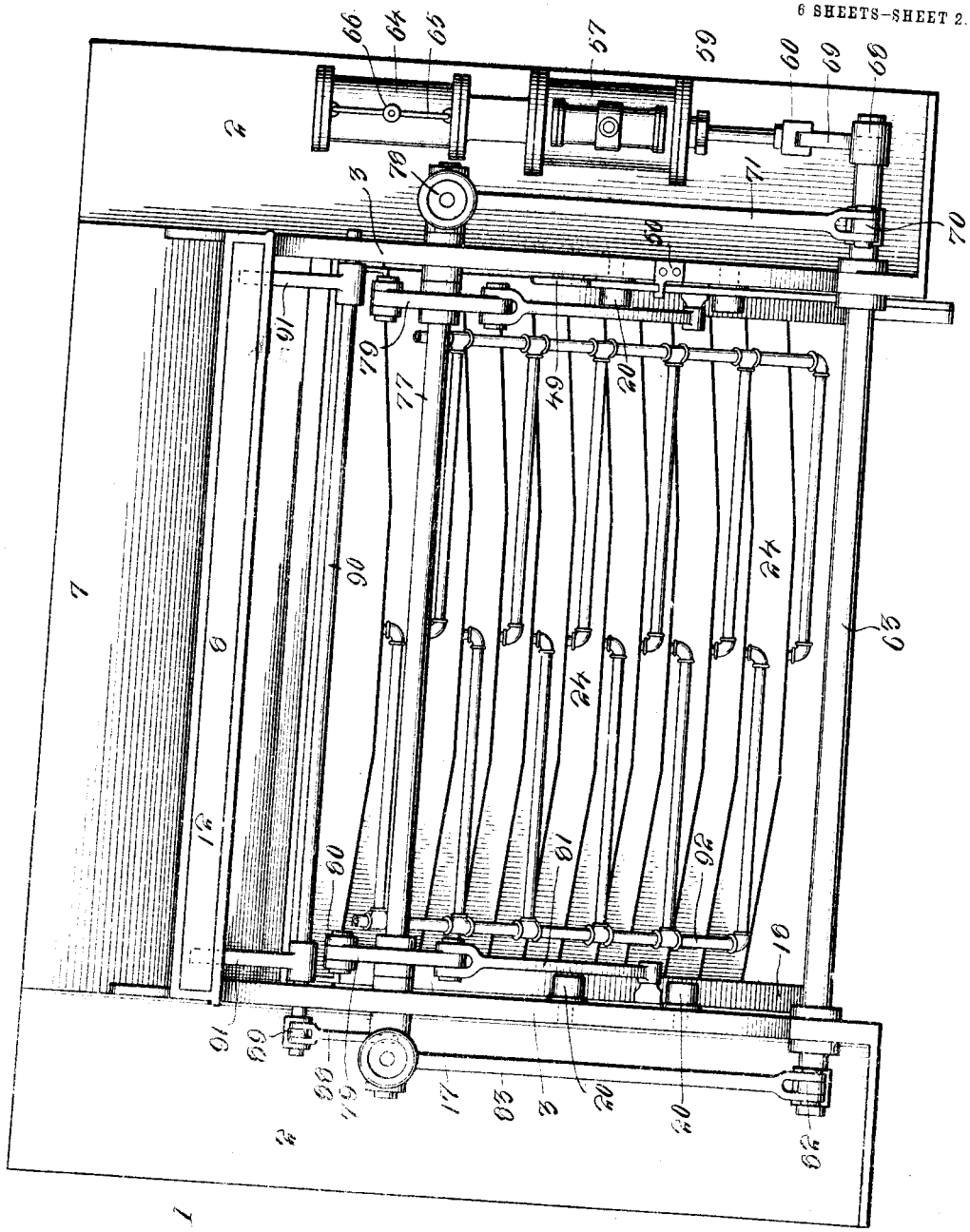

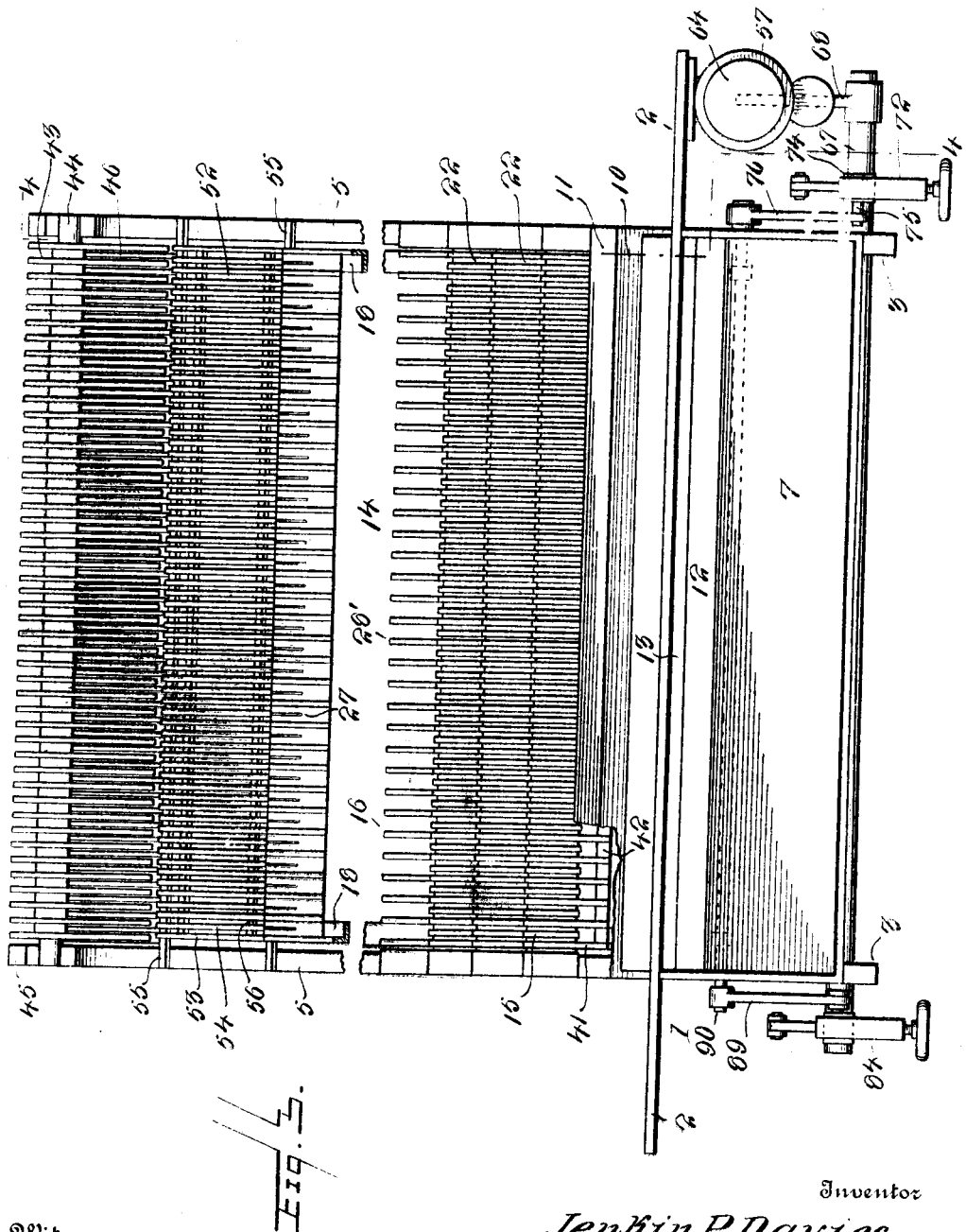

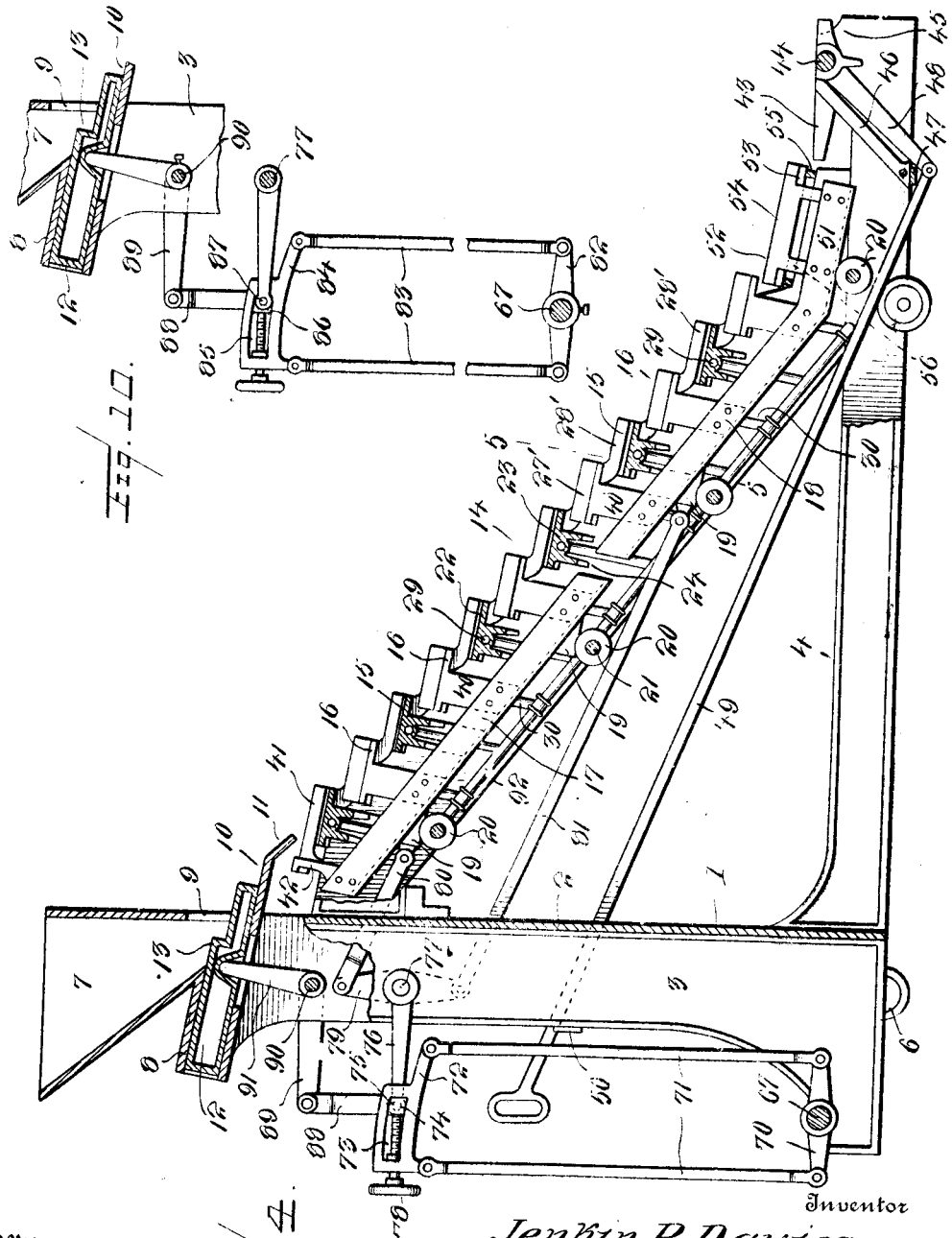

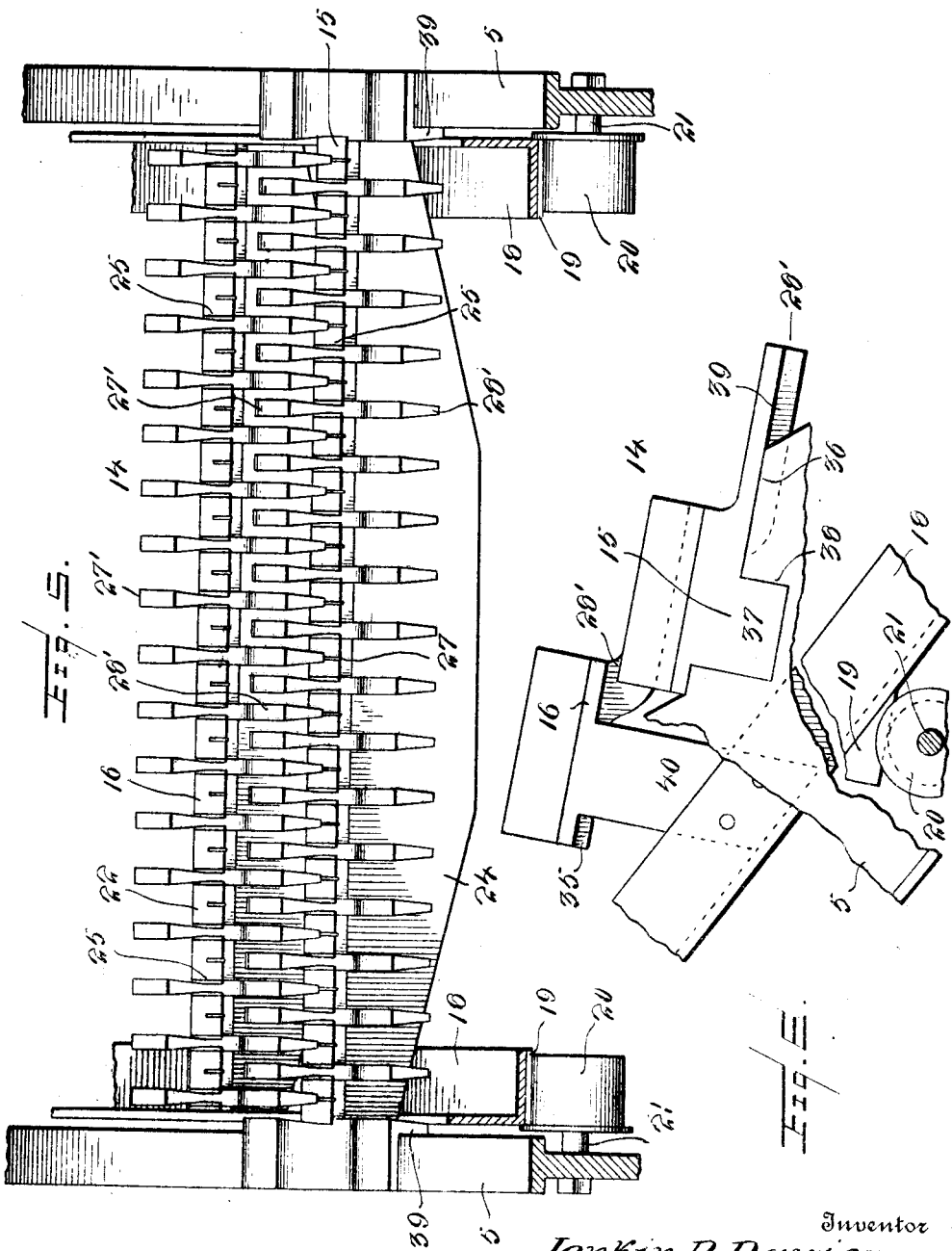

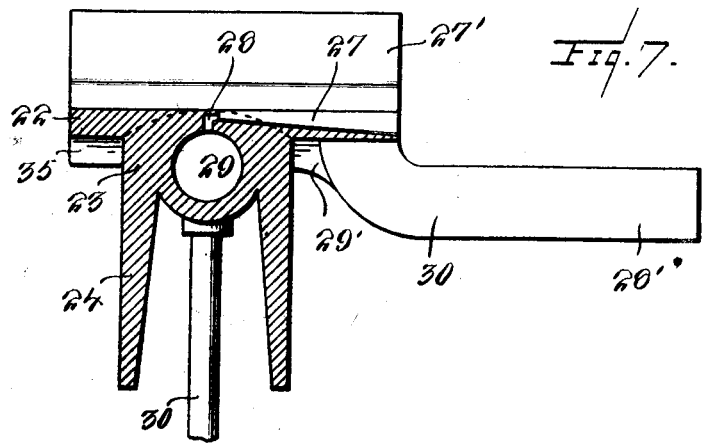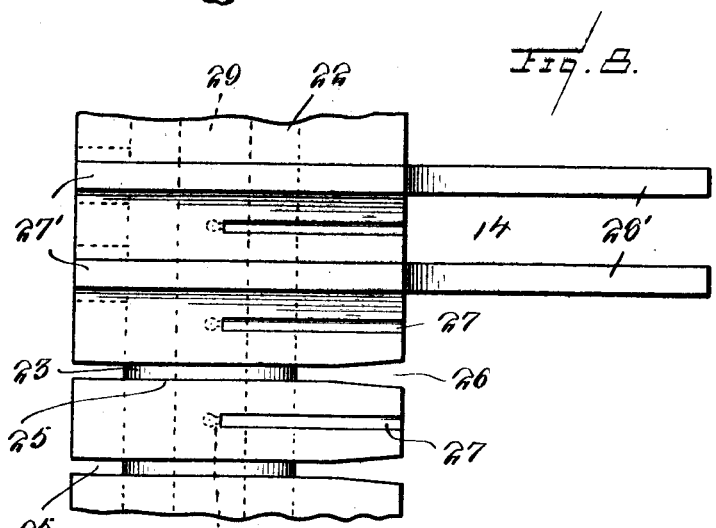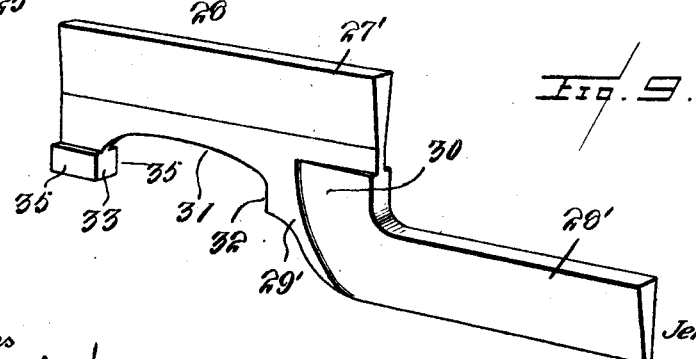

JENKIN P. DAVIES, OF CINCINNATI, OHIO.

MECHANICAL STOKER.

1,025,788.

Specification of Letters Patent.  Patented May 7, 1912.

Application filed November 18, 1910. Serial No. 593,084.

*To all whom it may concern:*

Be it known that I, JENKIN P. DAVIES, a citizen of the United States, residing at Cincinnati, in the county of Hamilton and State of Ohio, have invented new and useful Improvements in Mechanical Stokers, of which the following is a specification.

This invention relates to mechanical stokers, and preferably, but not necessarily, to portable stokers of that kind having frames which form the front walls of the furnaces to which they are applied and are capable of being removed bodily for cleaning, repairs and other purposes.

The main object of the present invention is to provide a mechanical stoker which shall be simple of construction and reliable and efficient in use and in which the fixed and movable grate bars are so related and have such a relative reciprocating motion as to secure a positive and constant movement of the fuel along the grate, whereby choking of the grate at any point will be prevented.

A further object of the invention is to provide grate bars which can be readily applied and removed as occasion requires, which have a self-cleaning action and which are provided with means for the passage of jets of steam between them and through the body of fuel thereon, whereby the surfaces of the bars will be kept cool, the fuel agitated, the disintegration of clinkers facilitated and the products of combustion oxygenated to effect a more thorough combustion of the fuel.

A still further object of the invention is to provide improved operating and controlling mechanism by which an even and regulated reciprocatory motion of the movable grate bars may be attained and their extent of motion varied; to provide a reliable non-choking feeder and operating mechanism therefor controllable to vary the extent of motion of said feeder; to provide novel means for discharging the ashes and dumping the residue; and to generally simplify and improve the construction and increase the general efficiency of apparatus of this class.

With these and other objects in view, the invention consists of the features of construction, combination and arrangement of parts, hereinafter fully described and claimed, reference being had to the accompanying drawings, in which:—

Figure 1 is a side elevation of a mechanical stoker embodying my invention. Fig. 2 is a front elevation of the same, the inlet ends of the main steam pipes being broken away. Fig. 3 is a top plan view of the apparatus with parts broken away to better illustrate the construction. Fig. 4 is a vertical longitudinal section on the line 4—4 of Fig. 3. Fig. 5 is a fragmentary vertical transverse section on the line 5—5 of Fig. 4. Fig. 6 is an enlarged detail view in side elevation of a portion of the grate, with parts broken away, showing adjacent fixed and movable grate sections. Fig. 7 is a section through one of the grate sections. Fig. 8 is a fragmentary top plan view of the same. Fig. 9 is a perspective view of one of the grate bars. Fig. 10 is a side view of the mechanism for operating the feeder.

Referring to the drawings, the numeral 1 designates the frame of the apparatus, which includes a pair of spaced upright front plates 2 extending edgewise in a direction transversely of the longitudinal line of the frame, a pair of standards 3 formed on or secured to the outer surfaces of said plates 2 and extending edgewise in the direction of the longitudinal line of the frame, horizontal base bars or sills 4 extending inwardly from the lower ends of the plates 2, and side bars 5 inclining downwardly and inwardly at an angle of about 45° from a point below the upper ends of the plates 2 to a point in rear of the inner ends of the sills 5, all of which parts are preferably made of angle metal firmly bolted or riveted together. The frame is preferably mounted on rollers 6 so that it may be rolled into and out of the open front of a furnace, the upright portion of the frame structure, when the apparatus is applied for use, forming the front wall of the furnace. The frame proper is completed by a hopper 7 extending transversely across and secured to the upper ends of the plates 2 and standards 3 and tying said parts together. Below the hopper and between the side plates and standards the frame is open for a full and effective feed of air to the grate. The base of the hopper is formed to provide a chamber 8, and the inner wall of the hopper is provided with a discharge opening 9 communicating with the inner end of said chamber. Extending inwardly from the bottom of the chamber is a delivery shelf 10 having a downwardly bent portion 11. A feeder 12 is arranged to reciprocate back and forth in the chamber 8 and through the opening 9. The upper surface of the forward end of this feeder is depressed below the plane of the upper surface of the rear end thereof to leave sufficient space above it in the opening 9 for the free discharge of the coal, and to form a ledge or shoulder 13 to force the coal through said opening. The shoulder and inner end of the feeder thus act to slide the dropping coal off the shelf onto the upper end of the inclined grate 14, the construction of which I will now proceed to describe.

As shown, the grate is supported by the side bars 5, inclines downwardly and forwardly at a corresponding angle thereto and is stepped to facilitate the feed of the coal and its turning over or agitation in its course of travel for the free passage of air therethrough and the presentation of all portions thereof to the action of the flames, whereby combustion is promoted. The grate consists of alternately arranged stationary and movable or reciprocating sections, the stationary sections 15 being directly mounted upon the side bars 5 while the movable sections 16 are mounted upon parallel pairs of upper and lower carrier bars 17 and 18 provided with track flanges 19 resting upon rollers 20 journaled on stub shafts 21 carried by the respective side bars, the said movable grate sections being arranged in upper and lower series mounted on the upper and lower carrier bars, respectively, and reciprocated in opposite directions in the operation of the apparatus. The grate sections 15 and 16 support and feed the burning bed of fuel and, with certain exceptions, are similar in construction, each consisting of a plate 22 formed upon a body portion 23 preferably having depending spaced longitudinal flanges 24 to give sufficient weight and strength thereto, said body portion being of less width than the plate. The plate is provided at regular intervals with transverse slots 25 extending through the projecting edges thereof and through its center down to the body portion 23, the forward ends of the respective slots being flared, as indicated at 26. Between the slots the plate is formed with feed grooves 27 communicating at their inner ends through ducts 28 with a longitudinal steam channel 29 formed in the body portion 23, with which communicates a branch steam supply pipe 30, the grooves extending from said ducts to and through the forward edge of the plate and gradually increasing in depth, as shown.

Each plate 22 carries a series of grate bars equal in number to the slots 25, each bar embodying an upper or main arm 27' and a lower downwardly and forwardly projecting arm 28', arranged below the plane of said main arm and connected with the lower front portion thereof by an offset 29'. The arm 27' is coextensive in length with the width of the plate 22 to which it is applied, while the arm 28' is adapted to extend over upon the plate 22 of the next adjacent lower grate section and is substantially coextensive in length with the width thereof, the arms of each bar being preferably tapered between their upper and lower edge to facilitate the gravital feed of the fuel between adjacent bars. The offset 29' has a beveled or thickened portion 30 to fit within the flared portion 26 of the slot 25 and the lower edge of the arm 27' is adapted to fit within the body of the slot and is formed with a recess 31 to receive and engage the upper surface of the body portion 23 and with front and rear shoulders 32 and 33 to bear against the front and rear edges of the said body portion, whereby the grate bar will be held from both lateral and longitudinal displacement. In order to prevent possibility of displacement of the bar under the impact of the moving mass of coal, the shoulder 33 is provided with lateral offsets 35 to engage under the rear portion of the plate at opposite sides of the slot when the bar is fitted in position, thus obviating any possibility of accidental disengagement of the bar from the plate, while permitting said bar to be applied and removed in a convenient manner. In applying each grate bar, the intermediate portion of the wall of the recess 31 is first fitted in the rear portion of the slot 25 while the bar is held at an upward and forward angle and the bar then drawn forward and its forward end depressed to bring the shoulders 35 and beveled surfaces 30 into locking position. Through a reverse movement of the bar, said bar may be readily detached in the operation of cleaning the grate or substituting a new bar therefor.

The arms 28' of the bars of the fixed grate sections overhang the plates of the next adjacent lower movable grate sections on lines between the arms 27' of the bars of the latter and in alternation therewith, while the arms 28' of the bars of the movable grate sections are correspondingly arranged with relation to the arms 27' of the bars of the next adjacent lower stationary grate sections, forming a continuous grated surface for the support of the fuel, the upstanding portions of which overlap on alternating lines for the free passage of the fuel from one grate section to the other and the constant turning over or agitation of the fuel on its passage, by which all surfaces of the traveling bed of fuel will be exposed for consumption, whereby thorough combustion and the utilization of all of the available combustible portions of the fuel will be insured. This action is further promoted by the gravital travel of the fuel down the inclined grate and the reverse reciprocatory motions of the upper and lower series of movable grate sections, by which a relative opening and closing motion between the stationary and movable grate sections is established whereby the bars of the grate sections are caused to work in opposite directions between each other and to automatically and alternately loosen up and turn over the coal and shift it from section to section downwardly on its forward feed. The arms 28' of one grate section overhang the feed grooves 27 of the underlying grate section, through which jets of steam are constantly supplied to stir up and free the particles of coal between the arms of the grate bars, such arms 28' thus acting as valves and deflectors to spread the jets of steam laterally and cause the same to pass upwardly through the spaces between said arms and the arms 27' of the said underlying grate section, whereby an effective agitation of the fuel is obtained. The jets of steam supplied in such manner further serve to oxygenate the products of combustion and facilitate their consumption, to cool the surfaces of the grate sections and diminish the liability of disintegration by heat, and to effect the breaking up of clinkers and other incombustible particles of the fuel, reducing to a great extent liability of choking of the grate sections. The ends of the plates of the stationary grate sections are provided with cast flanges which close the channels thereof and are adapted to rest upon stepped supporting surfaces 36 on the bars 5, said flanges having depending lugs 37 to fit within seat recesses 38 in said bars and flanged arms 39 to bear against the inner surfaces of the bars, whereby said grate sections are held from casual displacement. The ends of the plates of the movable grate sections are formed with similar flanges having depending shanks 40 secured to the bars 17 or 18, as the case may be.

The construction of the fuel-supporting portion of the grate is that described throughout except at the extreme upper end of the grate, where movable grate bars 41 which are straight throughout are provided for coöperation with the underlying movable grate section, said bars being otherwise constructed as before described for interlocking engagement with a slotted transverse, flanged supporting rail 42 disposed beneath the shelf 10 and connected with the upper carrier bars 17 for reciprocation with the upper series of movable grate sections.

At the base of the grate frame I provide a dumping grate section 43 having eccentrically disposed trunnions 44 journaled in bearings formed in upturned extensions 45 of the inner ends of the sills 4, the outer side of said grate section being heavier to drop by gravity and dump the ashes and remaining unconsumed products of combustion into the ash pit when such grate section is released for tilting movement. This grate section is normally disposed in a horizontal position, and extending upwardly between the bars on its dumping side are stationary rake bars 46 fixed to a cross piece 47 extending between the sills, said rake bars operating to loosen and free the clinkers and ashes and permit ready motion of the grate section and deposit of the clinkers and ashes into the ash pit. Connected with the said grate section is a crank arm 48 pivotally coupled to an operating rod 49 extending outwardly through the open front of the apparatus and adapted to be engaged with a latch member 50 upon the frame structure to hold the grate in normal position. Upon releasing and shoving the rod inwardly the grate section will be tilted to dump its load. The lower ends of the carrier bars 18 are bent at an intermediate angle between the horizontal and 45° angle of the fuel-supporting grate to form supporting members 51 for an intermediate grate section 52 arranged between the dumping grate 43 and the lower section of the inclined fuel supporting grate to finally separate the ashes and clinkers from the fuel prior to its passage to the final or dumping grate section. This intermediate grate section consists of alternately arranged stationary and reciprocating bars 53 and 54, the bars 53 being secured to cross pieces 55 extending between the frame pieces 5 and the bars 54 to cross pieces 56 secured to the supports 51. In the operation of the grate the particles of fuel falling upon the grate section 52 are agitated by the relative reciprocating motion between the grate bars thereof, whereby the ashes and small clinkers and unconsumed portions of fuel are separated from the larger clinkers and unconsumed portions of the fuel and allowed to drop into the ash pit.

The mechanism employed for reciprocating the feeder and movable grate sections preferably comprises a steam or other fluid pressure cylinder 57, having suitable admission and exhaust ports and valve mechanism for the supply and exhaust of steam to and from the opposite ends thereof. Operating in said cylinder is a piston 58 movable in reverse directions by fluid pressure, the rod 59 of which extends outwardly through stuffing boxes in the upper and lower ends of said cylinder, the lower end of the rod being connected with a cross head 60 traversing a suitable guide 61, all of the parts of the operating mechanism above described and to be described being supported upon the front portion of the frame structure. The upper end of the rod 59 is connected with the rod 62 of a piston 63 movable in a superposed cushioning or regulating cylinder 64, containing oil or other fluid disposed on opposite sides of the piston and movable from end-to-end of the cylinder through a bypass pipe 65 having a controlling valve 66 to regulate the passage of the fluid. The body of fluid in the cylinder 64, through its resistance to the movement of the piston 63 in either direction, regulates the motion of the piston 58 and prevents the latter-named piston from moving unevenly or abruptly under fluctuations of steam pressure, by which an even and regulated motion of the power piston is attained at all times to secure a corresponding evenness of motion of the feeder and movable grate sections operated therefrom. Journaled on the front of the frame is a rock shaft 67 provided with a crank arm 68 connected by a link 69 with the cross head 60, on which shaft is also a rocker lever 70 having oppositely extending arms to which are pivoted the lower ends of the links 71 of a parallel motion mechanism, said links being pivotally coupled at their upper ends to a rocker arm 72 having on one side of its center a longitudinal slot 73, in which is slidably mounted a block 74 receiving a crank pin 75 on the outer or free end of a crank arm 76 attached to a second transverse rock shaft 77, the construction being such that upon the opposite motions of the power piston the links will be alternately reciprocated in reverse directions up and down and transmit motion to the rocker arm 72. When the block is arranged at the inner end of the slot 73, it is disposed on center at a point equidistantly between the links, so that in such arrangement under the motion of the links the block and arm will simply tilt on the wrist pin 75 without transferring motion to the arm 76. An adjusting screw 78 is connected with the block whereby the latter may be moved outward in the slot 73 to a position beyond center, so that the rocking motion of the arm 32 will transmit a corresponding motion to the arm 76 to rock the shaft 77 to greater or less degrees according to the extent of outward adjustment of the block. The shaft 77 carries at each end a rocker lever 79 having upwardly and downwardly extending arms, to which arms the carrier bars of the upper and lower series of movable grate sections are respectively connected by links 80 and 81, whereby the rocking motion of the shaft 77 will be transmitted to said grate sections to reciprocate the same in opposite directions. On the opposite end of the shaft 67 from the arm 68 and lever 70 is a rocker lever 82 similar to said lever 70, to the arms of which are connected the lower ends of the links 83 of another parallel motion mechanism, the upper ends of which links are pivotally coupled to the ends of a rocker arm 84 having a longitudinal slot 85 on one side of its center. In this slot 85 is slidably mounted a block 86 carried by a wrist pin 87 on the lower end of a supporting link 88 connected at its upper end by a crank arm 89 with a third transverse rock shaft 90, which shaft is provided with crank arms 91 pivotally engaging recesses in the feeder 12, whereby the rocking motion of said shaft 90 will be transmitted to the feeder. It will, of course, be understood that through this second parallel motion mechanism just described the feeder may be thrown out of operation while the power mechanism remains in action and its stroke or degree of reciprocatory motion regulated to accord with the stroke of the movable grate sections to feed the proper amount of fuel to the grate. It will also be understood that as the feeder operating mechanism receives power from the same source as the grate operating mechanism an even and regulated feed motion will also be secured. The branch steam supply pipes 30 which supply steam to the channels 29 of the stationary and movable grate sections preferably extend laterally below said grate sections toward opposite sides of the frame where they are connected with main steam supply pipes 92 adapted to be connected at their upper ends to any suitable source of steam supply, (not shown). The pipes 92 extend longitudinally along the sides of the frame and by reason of their angular disposition to the horizontal lines on which the movable grate sections reciprocate are adapted to bend or flex sufficiently to permit such reciprocating motion without injury.

From the foregoing description, taken in connection with the accompanying drawings, the construction and mode of operation of my improved automatic stoker will be readily understood and its advantages appreciated without further description.

It will be understood that while I have shown in the present instance the embodiment of the invention in a portable stoker, it is, of course, apparent that the same principles of construction may be employed in a stoker forming a stationary part of the furnace, and, hence, the invention is not limited in this particular.

Having thus described my invention, I claim:—

1. A mechanical stoker including an inclined grate embodying stationary and reciprocatory grate sections having grate bars extending transversely thereof, the bars of each grate section being arranged to overlap the next adjacent grate section and to operate between the grate bars thereof when said reciprocatory grate sections are reciprocated, said reciprocatory grate sections being connected in series above and below the transverse center of the grate, and means for simultaneously reciprocating one of the series of reciprocatory grate sections in one direction and the other series of reciprocatory grate sections in the opposite direction.

2. A mechanical stoker comprising a frame, a reciprocatory feeder, an inclined grate embodying stationary and reciprocatory grate sections having grate bars extending transversely thereof, the bars of each grate section being arranged to overlap the next adjacent grate section and to operate between the grate bars thereof when said reciprocatory grate sections are reciprocated, said reciprocatory grate sections being connected in series above and below the transverse center of the grate, and means for simultaneously reciprocating the feeder and one of the series of reciprocatory grate sections in one direction and the other series of reciprocatory grate sections in the opposite direction.

3. A mechanical stoker comprising a frame, an inclined fuel grate embodying stationary and movable sections, said movable sections being connected in series above and below the transverse center of the grate, a feeder for supplying fuel at the upper end of the grate, a horizontal dumping grate section, a sifting grate section composed of relatively fixed and movable bars and arranged between said dumping grate section and the lower end of the fuel grate, and means for operating the feeder and simultaneously reciprocating the upper and lower series of movable fuel grate sections in opposite directions, said movable bars of said sifting grate section being connected for movement with said lower series of movable fuel grate sections.

4. In a mechanical stoker, an inclined grate comprising alternately arranged stationary and movable grate sections, said sections being arranged in stepped relation and each provided with grate bars having extensions overlapping the next adjacent lower section to operate between the grate bars thereon when said movable grate sections are reciprocated, and mechanism for reciprocating said movable grate sections.

5. In a mechanical stoker, an inclined grate comprising alternately arranged stationary and movable grate sections, said sections being arranged in stepped relation and each embodying a body portion provided with a plurality of grate bars detachably connected therewith and having extensions arranged to overlap the next adjacent lower sections to operate between the bars thereon when said movable grate sections are reciprocated, and mechanism for reciprocating said movable grate sections.

6. In a mechanical stoker, an inclined grate comprising alternately arranged stationary and movable grate sections, said sections being disposed in stepped relation and each embodying a body portion having a plurality of spaced bars detachably connected therewith and provided with extensions overlapping the body portion of the next adjacent lower section to operate between the bars thereon when said movable grate sections are reciprocated, and mechanism for reciprocating some of the movable grate sections in one direction and others in the reverse direction.

7. In a mechanical stoker, an inclined grate comprising alternately arranged stationary and movable sections disposed in stepped relationship and each comprising a body provided with a plurality of spaced transverse bars, the bars of each section having extension arms overlapping the body of the adjacent lower section and alternating in arrangement with the bars thereon to operate between the same when said movable grate sections are reciprocated, and mechanism for reciprocating some of the movable grate sections in one direction and others in the reverse direction.

8. In a mechanical stoker, an inclined grate comprising alternately arranged stationary and movable sections disposed in stepped relation and each embodying a substantially flat fuel-supporting surface having upstanding bars provided with extensions offset below the plane of said surface and extending downwardly over the surfaces of the adjacent lower sections to operate between the bars thereon when said movable grate sections are reciprocated, and mechanism for reciprocating the movable grate sections.

9. In a mechanical stoker, an inclined grate comprising alternately arranged stationary and movable sections disposed in stepped relation, each section comprising a body plate having slots therein and grate bars having upper arms fitting in said slots and interlocking with the plate and lower arms offset below the plane of said upper arms and extending over the next adjacent lower grate section to operate between the upper arms thereof when said movable grate sections are reciprocated, and means for reciprocating said movable grate sections.

10. In a mechanical stoker, an inclined grate comprising alternately arranged stationary and movable sections, each comprising a body portion having a plurality of transverse slots and carrying bars provided with upper arms extending across said body portion and fitted in the slots and interlocked with the body portion and provided with lower arms offset to extend over the next adjacent grate section and between the upper arms of the bars thereof when said movable grate sections are reciprocated, and means for reciprocating some of the movable grate sections in one direction and others in the reverse direction.

11. In a mechanical stoker, an inclined grate comprising alternately arranged stationary and movable sections carrying bars disposed in stepped relation, the bars of one section projecting over the next succeeding section to operate between the bars thereon when said movable grate sections are reciprocated, means connecting the movable sections in series above and below the transverse center of the grate, and means for simultaneously reciprocating the upper and lower series of movable bars in opposite directions.

12. In a mechanical stoker, a grate comprising alternately arranged stationary and movable sections, each section comprising a body having a steam channel, transverse grooves in the upper face of the body communicating with said channel and grate bars between the grooves, the bars of each grate section having extensions projecting above the grooves of the next adjacent grate section, and means for reciprocating said movable grate sections.

13. In a mechanical stoker, a grate comprising alternately arranged stationary and movable sections, each section comprising a body having a steam channel, transverse grooves in the upper face of the body communicating with said channel and grate bars between the grooves, the bars of each grate section having extensions projecting above the grooves of the next adjacent grate section, steam supply pipes arranged below the grate and communicating with said channels, means connecting the movable grate sections in series, and means for reciprocating the series of movable grate sections in opposite directions.

14. In a mechanical stoker, a grate comprising alternately arranged stationary and movable sections, each section being provided with bars and steam feed grooves between the bars and gradually increasing in depth toward their outer ends, the bars of each section having extension bars overlying the steam feed grooves of an adjacent section and controlling the feed of steam through said grooves, and means for reciprocating the movable grate sections.

15. In a mechanical stoker, an inclined grate comprising alternately arranged stationary and movable sections disposed in stepped relation, each section having transverse grate bars and steam inlets between the same, said bars being provided with extensions projecting between the transverse grate bars of the next adjacent lower section and controlling the steam inlets therein, and means for reciprocating said movable grate sections.

16. In a mechanical stoker, the combination, with a feeder, of an inclined main grate including a frame, a horizontal dumping section having spaced bars and pivoted to tilt vertically, a horizontal intermediate grate between the inclined grate and dumping section, said main and intermediate grate having stationary and reciprocating sections, means for reciprocating said reciprocating sections of the main and intermediate grates, and fingers fixed to the frame at a point between the intermediate grate and dumping section and inclining upwardly between the bars of said dumping section.

17. In a mechanical stoker, a stepped, inclined fuel-supporting grate composed of alternately arranged stationary and reciprocating sections, each of said sections having grate bars overlapping the next adjacent lower section and working between the bars thereof, means connecting the reciprocating sections of the fuel grate in series above and below the transverse center of said grate, a dumping section beyond the lower end of the fuel-supporting grate, a sifting section arranged between said dumping section and the lower end of the fuel-supporting grate and comprising stationary and reciprocating bars, the latter being connected for movement with the lower series of reciprocating fuel grate sections, and means for simultaneously reciprocating said upper and lower series of reciprocatory fuel grate sections in opposite directions.

18. In a mechanical stoker, a grate including movable sections, a steam power cylinder and piston, a rock shaft actuated thereby, a rocker arm thereon, a second rock shaft, means operated thereby for transmitting motion to the movable grate sections, a crank arm carried by said second rock shaft, a block pivotally engaging said crank arm, a second rocker arm having a slot on one side of its center slidably engaging said block, means for adjusting the block within said slot, and parallel motion links connecting the rocker arms.

19. In a mechanical stoker, a grate including movable sections, a reciprocating feeder, a steam power cylinder and piston, a rock shaft, a pair of rocker arms thereon, a second rock shaft, means operated thereby for transmitting motion to the movable grate sections, a third rock shaft for transmitting motion to the feeder, crank arms carried by said second and third rock shafts, blocks pivotally connected with said crank arms, slotted rocker arms receiving said blocks, means for adjusting the slotted arms upon the blocks, and sets of parallel motion links connecting the respective slotted rocker arms with the rocker arms upon the first-named rock shaft.

20. In a mechanical stoker, a grate including movable sections, primary and secondary rock shafts, the latter being connected with the movable grate sections for transmitting motion thereto, a steam power cylinder and piston, a rocker arm carried by the primary rock shaft and actuated by said piston, a slotted secondary rocker arm, a crank arm carried by the secondary rock shaft and with which said slotted rocker arm is slidably and pivotally connected for adjustment to regulate the stroke of the secondary rock shaft, and parallel motion links connecting said rocker arms.

21. In a mechanical stoker, a grate comprising fixed sections and movable sections, said movable sections being connected in oppositely reciprocating series, a rock shaft, connections between the same and said series of movable grate sections for simultaneously reciprocating the latter in opposite directions, a crank arm carried by said rock shaft, a block pivoted thereto, a rocker arm having a slot slidably receiving said block, means for adjusting the block in the slot, a second rock shaft having oppositely projecting crank arms, and parallel motion links connecting said crank arms with the ends of the rocker arm.

22. In a mechanical stoker, a grate embodying stationary grate sections and two series of oppositely reciprocatory grate sections, said stationary and reciprocatory grate sections having interworking grate bars, a steam power cylinder and piston, a rock shaft actuated thereby, parallel motion transmission mechanism operated by the shaft for reciprocating said reciprocatory grate sections, and means for controlling said transmission mechanism for rendering the same operative or inoperative and varying the working stroke thereof.

In testimony whereof I affix my signature in presence of two witnesses.

JENKIN P. DAVIES.

Witnesses:
C. C. HINES,
BENNETT S. JONES.